(12) United States Patent
Neal et al.

(10) Patent No.: US 11,349,792 B2
(45) Date of Patent: May 31, 2022

(54) IDENTIFICATION OF SOURCES OF MEDIA TRAFFIC THROUGH A NETWORK

(71) Applicant: SINCH SWEDEN AB, Stockholm (SE)

(72) Inventors: Peter Neal, Belrose (AU); Owen Mark Davies, Thornleigh (AU); Richard David Cochrane Dodds, Bondi Beach (AU)

(73) Assignee: SINCH SWEDEN AB, Stockholm (SE)

(*) Notice: Subject to any disclaimer, the term of this patent is extended or adjusted under 35 U.S.C. 154(b) by 0 days.

(21) Appl. No.: 15/546,799

(22) PCT Filed: Jan. 29, 2016

(86) PCT No.: PCT/EP2016/051990
§ 371 (c)(1),
(2) Date: Jul. 27, 2017

(87) PCT Pub. No.: WO2016/120476
PCT Pub. Date: Aug. 4, 2016

(65) Prior Publication Data
US 2018/0013705 A1    Jan. 11, 2018

(30) Foreign Application Priority Data
Jan. 30, 2015    (GB) ..................... 1501602

(51) Int. Cl.
*H04L 51/00*    (2022.01)
*H04L 51/58*    (2022.01)
(Continued)

(52) U.S. Cl.
CPC .............. *H04L 51/12* (2013.01); *H04L 51/38* (2013.01); *H04W 4/12* (2013.01); *H04W 4/14* (2013.01); *H04W 12/08* (2013.01); *H04W 12/12* (2013.01)

(58) Field of Classification Search
CPC ........ H04L 51/12; H04L 51/38; H04W 12/08; H04W 12/12; H04W 4/12; H04W 4/14
(Continued)

(56) References Cited

U.S. PATENT DOCUMENTS 9,174,648 B2 * 11/2015 Luong .................... H04L 51/38
9,356,953 B2 * 5/2016 Efrati .................... H04W 12/12
(Continued)

FOREIGN PATENT DOCUMENTS

WO    2014187696 A1    11/2014

OTHER PUBLICATIONS

Search Report from GB Application No. 1501602.5 dated Jul. 22, 2015.
(Continued)

*Primary Examiner* — Younes Naji
(74) *Attorney, Agent, or Firm* — Lando & Anastasi, LLP

(57) ABSTRACT

A method for identifying one or more unauthorised routes used for the termination of application-to-person (A2P) short message service (SMS) messages to a mobile telecommunications network, and a system for use in performing the method. An application service is stimulated to generate an A2P SMS message, and to send it to a collection point. The message is processed to obtain an identifier identifying a source of the message, and it is determined whether the identifier corresponds to an authorised source of A2P traffic to the network.

20 Claims, 4 Drawing Sheets

(51) Int. Cl.
H04W 4/14 (2009.01)
H04W 12/08 (2021.01)
H04W 12/12 (2021.01)
H04W 4/12 (2009.01)

(58) Field of Classification Search
USPC .......................................................... 709/206
See application file for complete search history.

(56) References Cited

U.S. PATENT DOCUMENTS

| | | | |
|---|---|---|---|
| 2005/0039043 A1* | 2/2005 | De Boursetty | H04W 12/35 726/4 |
| 2007/0275739 A1 | 11/2007 | Blackburn | |
| 2010/0112993 A1* | 5/2010 | Peng | H04M 3/5322 455/415 |
| 2010/0235911 A1* | 9/2010 | Nooren | H04W 12/12 709/206 |
| 2011/0130127 A1 | 6/2011 | Worth et al. | |
| 2012/0289191 A1* | 11/2012 | Puura | G06Q 30/06 455/406 |
| 2014/0004892 A1 | 1/2014 | Murynets et al. | |
| 2014/0179360 A1* | 6/2014 | Jackson | H04W 12/128 455/466 |
| 2014/0274171 A1 | 9/2014 | Cooper et al. | |

OTHER PUBLICATIONS

GSM Association: "End-to-End Functional Capability Specification for Associate—PLMN SMS—Roaming", Oct. 10, 2005; retrieved from the Internet: <http://gsma.com/newsroom/wp-content/uploads/2012/12/IR.31v3.1.0.pdf>.

International Search Report and Written Opinion from corresponding International Application No. PCT/EP2016/051990 dated May 23, 2016.

* cited by examiner

IDENTIFICATION OF SOURCES OF MEDIA TRAFFIC THROUGH A NETWORK

CROSS-REFERENCE TO RELATED APPLICATIONS

This application is a U.S. National Stage Application under 35 U.S.C. § 371 of International Application No. PCT/EP2016/051990, filed Jan. 29, 2016, titled IDENTIFICATION OF SOURCES OF MEDIA TRAFFIC THROUGH A NETWORK, which claims priority to United Kingdom Application No. 1501602.5, filed Jan. 30, 2015. International Application No. PCT/EP2016/051990 is incorporated by reference herein in its entirety.

This invention relates to methods for uncovering the passage of unauthorised media traffic through a telecommunications network so that such traffic may be reduced or blocked. More particularly, the invention provides methods and systems for identifying sources of application-to-person short message service messages, sent to subscribers to the telecommunications network, that are not authorised to make use of the network for that purpose.

BACKGROUND TO THE INVENTION

Short message service (SMS) is a well-known and popular technology for the interchange of short text messages, typically composed of up to 160 alphanumeric characters, between parties.

As first conceived and applied over twenty years ago, SMS provided a way for individuals subscribed to a mobile communication system to exchange such messages through suitable devices. As is well-known by those of skill in the art, SMS messages are sent and received according to standardised communications protocols, based on those originally defined in the Global System for Mobile Communications (GSM) series of industry standards and now specified in the more recent $3^{rd}$ Generation Partnership Project (or 3GPP). Communication between the individual network elements is typically implemented using signals based on the Signalling System no. 7 set of signalling protocols, commonly referred to simply as SS.7 and defined as the standard for signalling in the telecommunications industry.

FIG. 1 is a simplified illustration of a typical GSM network supporting conventional SMS, and will now be used to describe briefly the typical sequence of signals used to deliver an SMS message from a first wireless handset 10 to a second wireless handset 20.

Referring to FIG. 1, a first mobile subscriber (the A party) uses an SMS application on her handset 10 to compose an SMS message 1, and to address the message to a second mobile subscriber (party B). Though party A and party B may in some cases be served by the same mobile carrier, this need not be the case, and the following discussion assumes the more general scenario in which the A party is subscribed to a first mobile network, referred to herein as the 'A party Public Land Mobile Network' (APLMN) (or simply the 'source network'), whilst the B party is served by a second, different carrier. The network serving the B party will be referred to herein as the 'Home Public Land Mobile Network' (HPLMN) or, equivalently, simply as the 'home network'. Thus, the message transfer shown in FIG. 1 may take place through an SMS signalling gateway or other suitable interconnection link, shown generally as cloud 50 in the drawing. Such signalling links are established for the purpose of exchanging SMS and other signalling messages between mobile networks, and may interconnect those networks within the same geographical region or internationally.

From terminal 10, message 1 is submitted, together with its intended recipient, to an SMS Centre (SMSC) 12 of the APLMN, which then initiates and manages the network signalling required to route the message to its destination (that is, to the B party's handset 20).

In order to forward the message successfully, SMSC 12 must first determine the identity and physical location of the destination handset 20. To do this, SMSC 12 invokes a standardised "send routing information" (or SRI) transaction to query a Home Location Register (HLR) for the HPLMN. The HLR, shown in FIG. 1 as database 24, contains details of every subscriber to the home network and, on request, retrieves the required routing information and returns it to SMSC 12 via interconnection link 50. In this example, HLR 24 provides to SMSC 12 the address of the home network message switching centre (MSC) 26 serving the geographical area in which the destination terminal 20 is currently located. The source SMSC may then forward the message 1 to the address provided for delivery to its intended recipient.

The message 1 entering the home network typically takes the form of a standardised data unit and includes, in addition to the text content composed by party A, a number of fields defining parameters of interest. Among these and of particular relevance to the present invention is the network address of the SMSC 12 itself used to route the message, which may take the form of a Global Title (GT) for the SMSC. Other information included in the message data may include, for example, the originating address of the message (that is, the "from" address that will appear on handset 20 when the message arrives and is displayed), the time at which the message was received at SMSC and the destination address.

The signalling routine just described realises the transmission of an SMS message from one mobile device to another, known as Peer-to-Peer (P2P) SMS. However, owing to the popularity of SMS as a communication medium it is being increasingly adopted by businesses, ranging from financial institutions to health services, as a channel to communicate with their customers. Rather than a mobile handset, such as handset 10 of FIG. 1, such a business may adopt a server-based solution to generate a mobile-terminating SMS message for delivery to a customer and to submit this message to the SMSC of an APLMN. From there, transfer of the message to the customer's mobile device takes place much as described above with reference to P2P messaging. This exchange of SMS messages between a server-based system and a mobile handset is commonly referred to as Application-to-Person, or A2P, SMS.

One important difference between P2P and A2P SMS relates to the source (or A-) network used in each case to transfer messages to the home network of their intended recipients. As described above, mobile-originating SMS messages are automatically submitted, from a user A's handset, to the SMSC of the network to which that user is subscribed. Conversely, the server-based system adopted by a commercial enterprise may choose to make use of an SMSC of any source network with an interconnection link to a particular customer's HPLMN in order to bring about delivery of its message. As a result, and since network interconnection today is commonplace and well-established, one implication of A2P SMS is that an individual HPLMN may constantly be receiving simultaneous SMS messages from many hundreds of SMSCs.

Though A2P SMS represents a powerful and often useful means of communication between businesses and their customers, abuse of the scheme is not uncommon. In particular, those operating A2P message servers commonly seek to send their messages via APLMNs that are known to have uncharged links with the home networks serving their customers. By paying such source networks a modest fee in exchange for use of those free links to the intended recipients of their SMS traffic, A2P operators can avoid any charges that the HPLMN might otherwise impose for the termination of SMS to its subscribers.

Furthermore, owing to varying levels of control imposed by individual APLMNs on the use of their SMSCs, A2P traffic often represents aggressive marketing or otherwise unwanted content for subscribers to an HPLMN, with the potential to cause irritation or even distress to those users. In addition, since a typical A2P server may generate tens or even hundreds of SMS messages per second, the proliferation of this approach can see the creation of unbalanced traffic between any one APLMN and a given HPLMN. Coupled with the freedom of application servers to choose any APLMN with a link to the HPLMN for delivery of each of their messages, this has the potential to overload the network resources of home networks targeted by application services.

In summary A2P SMS, though itself a legitimate and valuable method of communication, is open to unauthorised use in which application services may deliver SMS messages to their customers' mobile devices through source networks that do not have the prior agreement of the HPLMNs to which those customers are subscribed. This is a recognised industry problem and several approaches to addressing it have been developed. For example, GSM standard IR.31 describes several screening methods that an HPLMN may adopt to block the delivery of problematic SMS messages to its subscribers.

The methods outlined in IR.31 rely on the interception of SRI requests arriving at an HLR from unauthorised sources of A2P SMS messages. By preventing those requests from reaching the HLR (or, alternatively, by configuring the HLR not to respond to the requests), an HPLMN operator can ensure that routing information relating to its subscribers is not made available to the SMSCs seeking to terminate the unwanted or unauthorised messages. Without the necessary information defining the identity and location of the destination terminal, the source SMSC cannot address its SMS message and is thus prevented from terminating the message to its intended recipient.

Crucially, to be able to apply the screening methods just outlined an HPLMN must know in advance which sources of A2P traffic it intends to block. In particular, according to IR.31 SRI requests are typically screened according to the GT of the calling SMSC, a decision being made to allow or to prevent the delivery of the message on the basis of that network address. Thus, the HPLMN must be able to specify, at the GT level, the sources from which it is not prepared to allow termination of A2P SMS to its subscribers. At the same time, though some source networks choose to route A2P SMS traffic through a small number of network addresses, others may terminate A2P messages from hundreds or even thousands of GTs maintained for this purpose. By continuously changing between these originating addresses and by spreading traffic across them, the source network operators seek to ensure that detection (and, thus, blocking) of their activity by the HPLMN is made more difficult. In such cases it can be important for home network operators to identify the network itself that is sourcing SMS traffic from an application service to its subscribers, as well as all numbering resources allocated to it. This identification of the source carrier may also be advantageous where both A2P and P2P messages are terminated from the same GT, so that simply blocking that GT would disrupt the routine delivery of mobile-originating SMS to the HPLMN's subscribers. In that case, the HPLMN operator may prefer to seek to establish a commercial agreement with the APLMN for the termination of A2P traffic to its network.

Currently, the identification of A2P traffic passing through a network with a view to applying these methods is performed by reviewing the signalling logs of the interconnect link between an HPLMN and each APLMN of interest. Imbalanced traffic, characterised by a dominance of the communications by messages sent from the APLMN (or from a particular one of the GTs allocated to it) to the HPLMN, is indicative that messages are being generated in an automated fashion by an application server. The home network operator can then determine whether or not it is prepared to accept those messages from the APLMN and/or GT in question, and may take appropriate action to block them if need be.

However, this review and the subsequent analysis are resource-intensive exercises. Even where an HPLMN operator is willing to accept that burden, this can mean that the data of interest are made available and updated too infrequently to enable the prompt and efficient identification of new unauthorised sources of A2P traffic.

In summary, we have appreciated that it would be desirable to provide an improved and reliable way to identify any unauthorised sources of A2P SMS sent to users of a mobile network that can aid the operator of the network in blocking such traffic in a straightforward and effective manner.

SUMMARY OF THE INVENTION

The invention is defined in the independent claims, to which reference should be made. Preferred features are set out in dependent claims.

Throughout this document, the word "unauthorised" is used to refer generally to sources from which A2P SMS messages are terminated to an HPLMN without the permission of the home network operator.

According to one aspect of the invention, there is provided a method for identifying one or more unauthorised routes used for the termination of A2P SMS messages to a mobile telecommunications network that includes the steps of providing a collection point arranged to receive SMS messages terminated to the network, stimulating an application service to send an SMS message to the collection point, after receiving the SMS message at the collection point, processing the message to obtain an identifier identifying a source of the SMS message, and determining whether the identifier corresponds to an authorised source of A2P SMS traffic to the network. In some embodiments of the invention, the source of the received A2P SMS message is classed as an unauthorised source if it is determined that the obtained identifier does not correspond to an authorised source.

The identification of the source of the SMS message preferably comprises the determination of a unique network address, such as a GT, associated with a network element used to route the message to the mobile telecommunications network. As discussed above, this may be advantageous in facilitating the application of industry standard methods for blocking the unauthorised A2P traffic. In other embodiments, the method may further or additionally comprise the step of identifying the source network itself used to route the message. Again as discussed above, this information may be of value to some HPLMN operators in its own right.

Thus, preferred embodiments of the method of the invention actively and deliberately stimulate an application service to generate and send an SMS message to a suitable collection point, such as a test mobile terminal used for the present purpose. In some embodiments, the stimulation may take the form of an interaction with the application that causes an SMS message to be generated. Accordingly, in contrast with the existing techniques outlined above, every message received at the collection point is by definition known to originate from an application service: the messages received are caused to be generated specifically for the purposes of abuse detection, and there is no collection of P2P messages. As a result, the invention does not rely on the ability to sift A2P messages from the volume of SMS traffic entering a home network. It follows that the identification of any APLMNs, or specific network addresses, that are sourcing A2P SMS to the HPLMN may be considerably more straightforward and efficient than are the existing methods described above. In particular, preferred embodiments of the invention may remove the need to scan all SMS traffic entering a network to discern which of the messages arriving represent application-originating, rather than mobile-originating, traffic. Resource-intensive analysis of call logs may be avoided.

Furthermore, embodiments of the invention may stimulate application services in turn, enabling the HPLMN to understand which source SMSCs are being used to route A2P traffic from which applications. This may be advantageous for estimating the potential revenue for the HPLMN that is being lost due to the application's use of unauthorised sources to deliver its SMS content.

According to embodiments of the invention, once the source of the SMS message received at the collection point has been identified this can simply be compared against a list of allowed senders to determine whether or not the source has permission to terminate A2P messages to the HPLMN. If not, the identifier can be considered to correspond to an unauthorised source of A2P SMS traffic.

The step of stimulating the application service to send an SMS message may comprise the steps of authenticating to the application service, entering a functional element within the service that requires delivery of an SMS message to an end user, identifying the collection point to the service and executing the service function.

Preferably, the method comprises the step of determining whether the identifier obtained from the SMS message corresponds to any of the sources listed in a list of authorised sources of A2P SMS messages. In preferred embodiments of the invention, an operator for the telecommunications network is notified when a source identifier is obtained that does not correspond to an authorised source of A2P SMS traffic. This may enable the operator to decide what, if any, corrective action to take. Preferably, if the identifier does not correspond to any of the sources in the list but is nevertheless determined to correspond to an authorised source of A2P SMS messages (for example, if the operator indicates that this is the case), the identified source may be added to the list of authorised sources. This may prevent unnecessary notification of the network operator in the future.

According to a second aspect of the invention, there is provided a system suitable for carrying out the method defined above. The system of the invention includes a collection point arranged to receive SMS messages terminated to the telecommunications network, a stimulus generator configured to stimulate an application service to send an SMS message to the collection point, and means for processing the message to obtain an identifier identifying a source of the SMS message.

The collection point preferably takes the form of GSM-enabled hardware attached to the mobile telecommunications network. The term "attached to" is used here to mean that the hardware is located within the mobile telecommunications network; in other words, it is subscribed to or served by the network in much the same way as end-users of the network services. For example, the hardware may include a subscriber identity module (SIM) card that is associated with the network.

Preferred embodiments of the system of the invention further include computing means arranged to determine whether the obtained identifier corresponds to an authorised source of A2P SMS messages to the network. This may advantageously allow steps of the present method to be automated which, in turn, may both reduce the effort required for its performance and provide improved reliability.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
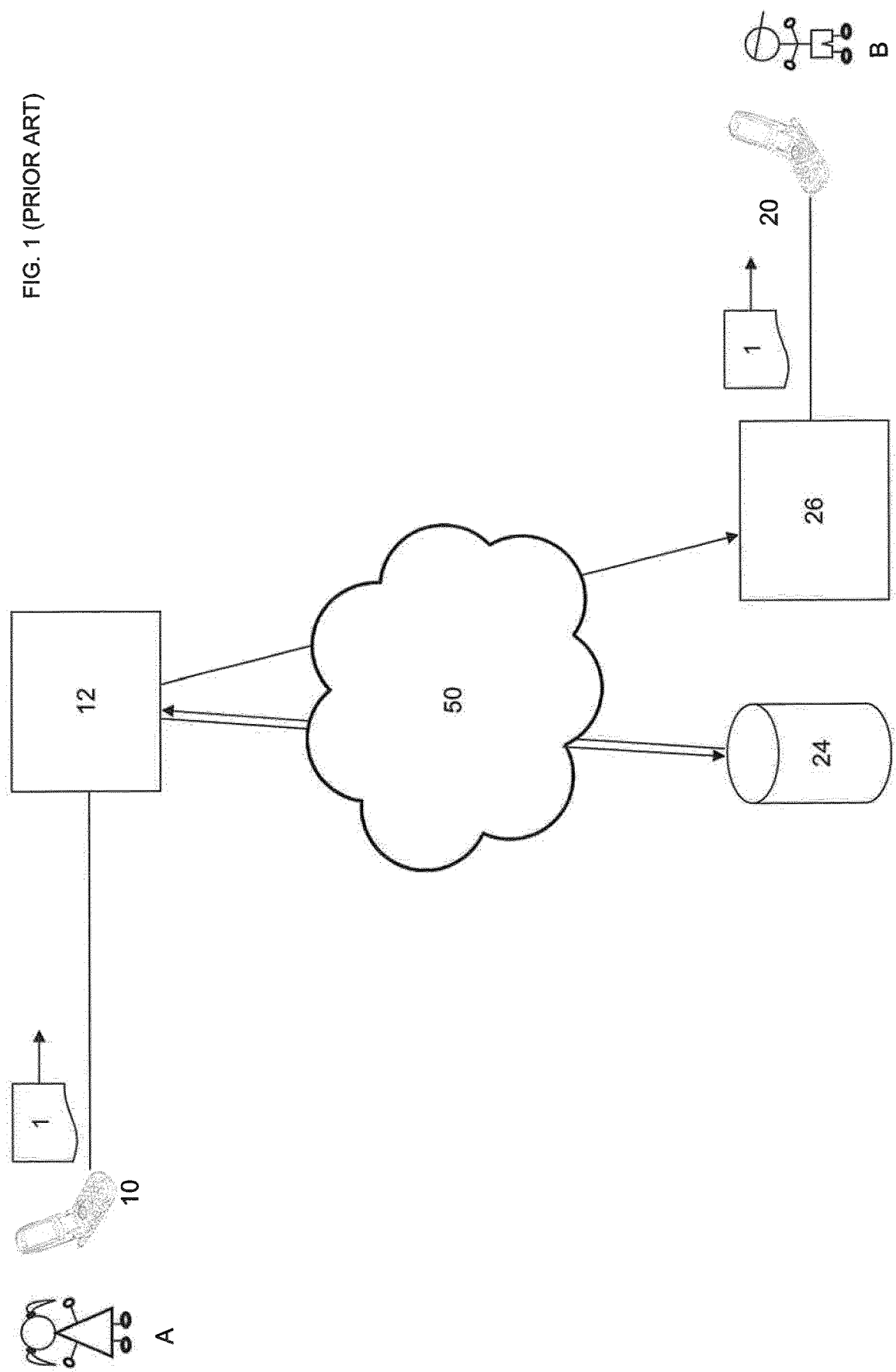
FIG. 1 is a simplified illustration of a conventional GSM network supporting SMS.

Embodiments of the invention may be applied wherever an HPLMN becomes aware that a given application service is making use of A2P SMS as a means of communication with its subscriber(s). For example, a user may register for an account with an Internet service and notice that he receives an SMS message as part of the registration process, causing him to investigate how that SMS was delivered. The or each application service may then be subjected to the procedure shown in FIG. 2, which is a flowchart illustrating a method 200 for detecting A2P SMS messages that are arriving at a home network from unauthorised sources according to one embodiment of the present invention.

As illustrated, in a first step 210 of method 200 the application service is stimulated to generate an A2P SMS message. As will be appreciated by those of skill in the art, the exact interactions with the application service that are required to cause an SMS message to be generated are specific to the application service in question. Indeed, some application services may routinely generate a variety of SMS messages, the content of which may depend on the intended recipient of the message (for example, whether that recipient is already a registered user of the application service), on the nature and extent of any interaction with the service by the user, or on one or more other factors. It is to be stressed that neither the nature of the interaction with the application service, nor the precise content of the SMS message caused to be generated, is material to the present invention. All that is required is that a message is created that is addressed to a suitable collection point attached to the HPLMN. The collection point will be discussed in further detail below.

Typically, stimulation step 210 of the method 200 may include the actions of authenticating to the application service and, subsequently, entering a functional element within the service that requires the delivery of an SMS message to an end user. The functional element chosen will depend on the application service under test but may be, for example, the page within an Internet banking application that initiates transfer to another account, generating an SMS message as part of the process. This is just one example, and appropriate functional elements of other application services will be readily apparent to those of skill in the art. The stimulation step may be completed by providing an identifier (such as a Mobile Station International Subscriber Directory Number, or MSISDN) to the service of the intended recipient of the message (the collection point), and executing the service function.

To give a concrete example: the HPLMN operator in this specific embodiment wishes to identify the source APLMNs used by a social media application to terminate SMS messages to those of its users that are also subscribers to the home network. Accordingly, the application is stimulated to generate an SMS message that includes content suitable for facilitating download of its mobile app to a user's handset, by executing the following steps:

1) browse to the appropriate area of the service's website;
2) indicate to the website that download of the app is desired, for example by clicking a button provided for this purpose;
3) when prompted, enter the country code and mobile telephone number (MSISDN) of the intended collection point;
4) click again to prompt the application to send the download instructions to the telephone number provided.

The interaction with the application service that is required to cause an SMS message to be generated could be performed manually by, for example, the home network operator, using a suitable device such as a mobile terminal or a personal computer connected to the application service. In this example, however, the steps just described are instead carried out in an automated fashion by suitably programmed hardware. This aspect of the invention, which is not essential, will be described in more detail below.

Figure 2:
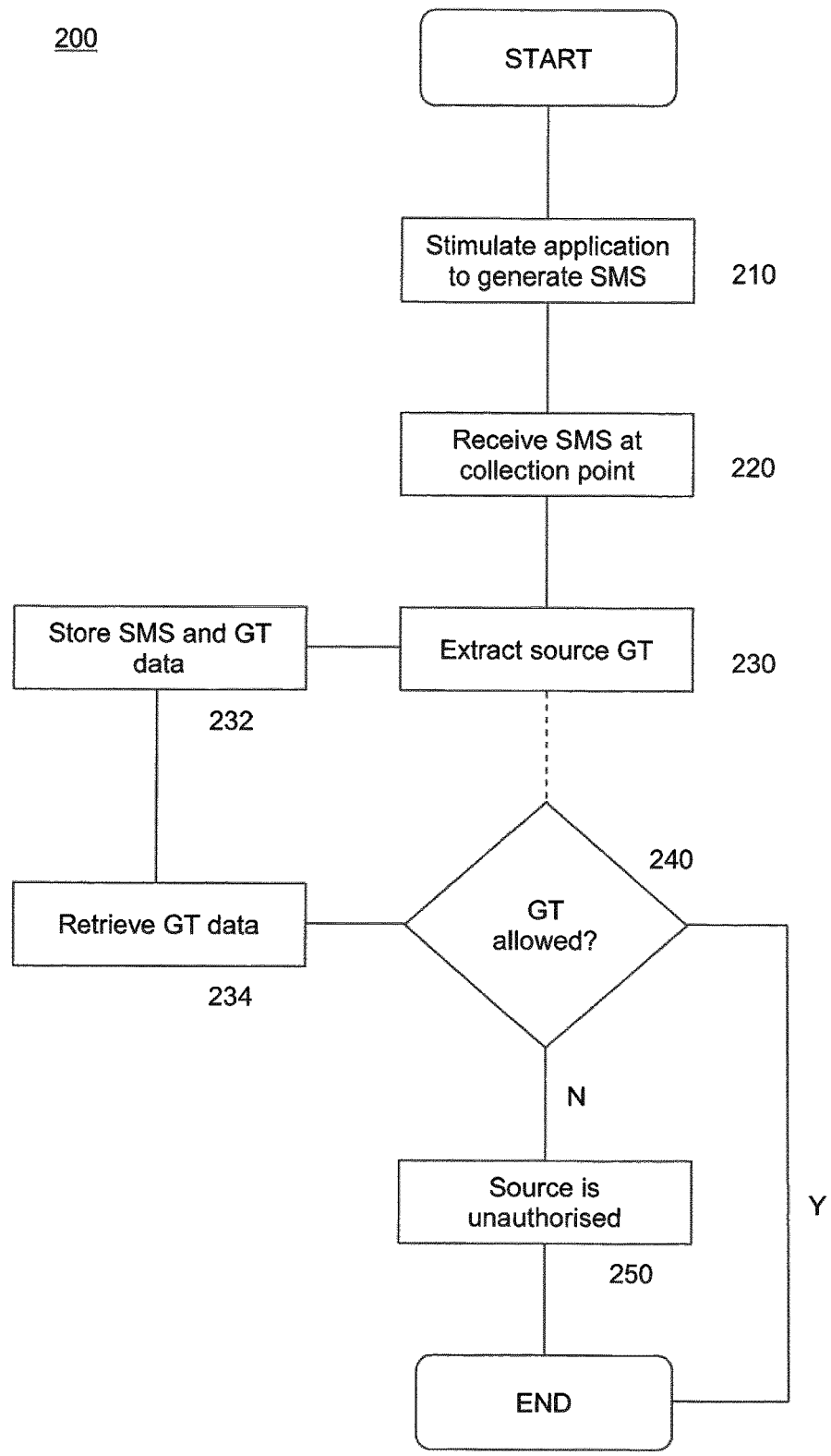
FIG. 2 is a flowchart illustrating schematically a first embodiment of the method of the present invention.

Returning now to the method illustrated in FIG. 2, once the interaction on the part of the HPLMN operator is complete the application service will generate an SMS message according to the stimulus provided. It will then send a request to an APLMN SMSC for the delivery of that message to the MSISDN provided at step 3) above, in the manner described above with reference to FIG. 1. Again, it is stated for the avoidance of doubt that the detailed steps carried out by the application service in order to terminate the SMS message to the collection point do not form part of the present invention.

Following receipt of the message at the collection point (step 220), the source APLMN used to deliver it is identified at step 230. In this example, this is done by extracting the GT associated with the SMSC of the source network from the received SMS message. In some embodiments, this is done by the collection point itself, though other methods in accordance with the invention may include a further step of forwarding the message from the collection point to dedicated hardware for processing. In still further embodiments, any other suitable identifier or network address that can be considered to identify the SMSC used to source the message, or the APLMN to which it belongs, could be used. For example, some networks are known to intercept incoming messages, directing them to an SMS router for the application of advanced services such as archiving and spam filtering before delivery to the ultimate recipient. The source GT changes to an 'alias' in this process; however, there is still a one-to-one correspondence to the source APLMN used to send the message, such that source can nevertheless be determined from the network address extracted from the message.

In the present embodiment, the SMSC GT extracted from the received SMS message is stored, together with the message content, in a database that is communicatively coupled to the collection point (step 232) and is later retrieved (step 234) for further use in method 200. This is not essential, and in other examples the method may pass directly from processing step 230 to comparison step 240, as indicated by the dashed line bypassing steps 232 and 234. In further examples still, the data may be used directly in decision step 240, but may additionally be stored (step 232) for further uses such as those detailed below.

In step 240, the SMSC GT extracted at step 230 is then read from the database and is examined to determine whether it is corresponds to an APLMN from which the HPLMN is prepared to receive A2P SMS messages. In the present embodiment, this determination is effected by performing a lookup against a list of GTs that are known to identify such allowed sources. Similarly to the stimulation step 210, this determination may in some examples be performed manually. Here, however, it is automated by programming suitable computing means, as will be discussed further below.

Thus, in the present example, the GT that is found to have sourced the test SMS message to the collection point is compared against a list of GTs that are known to correspond to allowed sources. As a purely numerical one, this comparison may have the advantage of being particularly easy to implement. The adoption throughout of GTs to refer to network entities may also make the method as a whole particularly simple, as well as facilitating any future action that is taken to block unauthorised sources according to the methods outlined in the IR.31 standard introduced above. However, a number of alternatives will be apparent to the skilled person. For example, if it is preferred to identify the source used to deliver the SMS message using an alternative form of identifier, it may be desirable to list the allowed sources according to the same format. Again, this may simplify the comparison step. In yet further examples, the allowed list may simply be a list of network names. The identity of the source network may in this case be determined from the GT extracted from the received message, for example, using the Global Title translation procedure familiar to those of skill in the art, for comparison against the list.

The allowed list used in step 240 of the present embodiment is populated in advance and stored in a data store ready for use in the inventive method. For instance, when authorizing an APLMN to terminate A2P SMS traffic to its subscribers, the operator of the HPLMN may request that source network to name all of the GTs that it will use to do so. It may also request to be informed of any future changes to that information so that the allowed list may be kept current and relevant. Alternatively, the GTs corresponding to an authorised source may be read into the list from the GSM standard document known as IR.21, in which network operators specify their active SMSC GTs. In other embodiments, the list may have been populated through previous iterations of the method shown in FIG. 2, the HPLMN operator determining on a case-by-case basis whether each new source SMSC that is identified is a legitimate sender of messages to the home network.

According to the present embodiment, if the GT extracted from the SMS message is identified as being one in the allowed list, the process ends. If, conversely, the GT is not identified in the list, it is concluded that the corresponding source network is an unauthorised one (step 250) and the method then ends.

Thus, the method outlined in FIG. 2 provides a simple and effective way for a home network operator to expose the use, by an application service, of unauthorised source networks to terminate SMS messages to its subscribers attached to the HPLMN. Following comparison step 240, the operator may then identify the APLMN operating the non-allowed GT and take the necessary action to block future A2P SMS from that network if appropriate or desired. For example, the operator may follow one of the procedures described IR.31.

As mentioned above, in the embodiment of FIG. 2 steps 210 to 250 are executed locally to the operator of the home network. This is not necessary, however, and in some cases the operator may prefer to commission the investigation into unauthorised termination of A2P SMS traffic to its network to a third party. Some suitable additional steps in that case will now be described in the context of one example of such a method.

In this particular example, the third party performs the steps described above with reference to FIG. 2, and it is determined that the source of the received message is unauthorised by the HPLMN. This fact is then reported to the operator of the home network.

The report according to this specific embodiment takes the form of an e-mail that is sent directly to the operator and includes the following exemplary information:
  the name of the application service tested;
  the content of the SMS message received at the collection point (in this case, read from the database in which it is stored at step 232, described above);
  the time of receipt of the SMS message at the collection point;
  the (unauthorised) source GT of the SMS message; and
  an identification of the APLMN associated with the source GT, such as the network name.

In further examples, the report may also include additional information useful to the HPLMN carrier in responding to the unauthorised use of their network, such as contact details of the operator of the identified APLMN; any other GTs known to be used by the APLMN for A2P SMS delivery; and/or the type of the source network. Preferably, the operator is given the opportunity to indicate that the identified source should in fact be recognised as a legitimate source of A2P SMS messages to their home network. In this case, the source GT may be added to the list of allowed sources so as not to be brought to the attention of the operator in any future iterations of the method.

It is stressed that the report described above is given by way of example only. In other embodiments, the third party may communicate the result of the investigation to the home network operator in any event, for example, identifying the APLMN found to have sourced the message and indicating to the operator whether or not that source is an authorised one. In still further embodiments, the third party may omit decision step 240 of method 200, generating instead a report that simply includes its factual findings as to the source GT used by the application service under test to terminate its message to the collection point. This information may then be communicated to the home network operator, which may then complete the determination as to the allowability of the identified use of its network.

Report e-mails such as those described above may be communicated to the HPLMN operator as soon as the investigation is complete or, alternatively, may be sent on an agreed periodic basis (for example, daily or weekly). As an alternative to e-mail, the results of the third-party's analysis may be uploaded to a dedicated reporting interface that the HPLMN operator can access whenever is most convenient.

Figure 3:
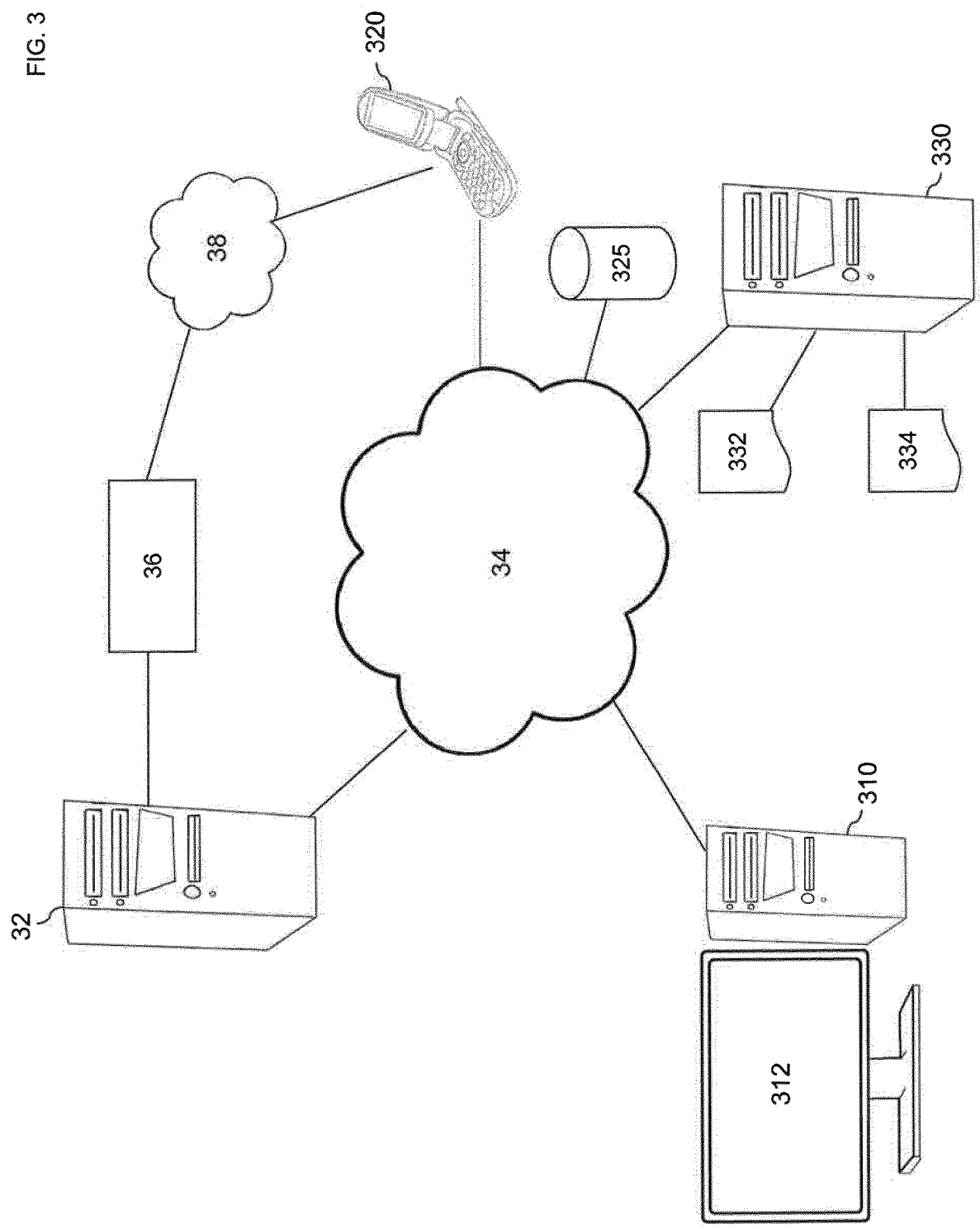
FIG. 3 is a schematic illustration of a system according to one preferred embodiment of the present invention.

Turning now to FIG. 3, an exemplary arrangement for carrying out the methods just described is illustrated in schematic overview. As shown, the system includes a stimulus generator 310 coupled to an interface 312; a collection point 320 in communication with a data store 325; and a report service 330 connected, in this embodiment, to the public Internet 34. The report service receives as an input a list 332 of allowed senders of A2P SMS to the HPLMN of interest, and is arranged to generate a report 334 in the manner described above, as will be discussed further below.

Also shown in FIG. 3 are a server 32 for an application service, in communication with stimulus generator 310 via Internet 34, and an SMSC 36 associated with an APLMN that the application server 32 may use to terminate A2P SMS messages to the home network. Referring to the discussion made above with reference to FIG. 1, SMSC 36 is in communication with collection point 320 via GSM interconnect link 38. (The HLR and MSC for the home network serving collection point 320 are omitted from FIG. 3 for clarity of illustration.) It is stressed that neither application service 30 nor SMSC 35 are intended to form part of the invention as such.

In this example, stimulus generator 310 takes the form of an interface engine connected to application 32 within an interface environment, and is programmed to perform a pre-defined series of interactions with the application service to cause an SMS message to be generated Specifically, the stimulus generator is a processor configured to appear to an application service as a smartphone. The stimulus steps that the simulator must take are programmed into a library of scripts that take the form of detailed instructions to the processor to carry out the steps that a user operating the service would perform on his smartphone.

In this specific example, server 32 belongs to the social media site given by way of example earlier, and engine 310 is configured to automate the interaction, described above, that a user of that site would normally execute to download the relevant mobile application to his handset. Of course, stimulus generator 310 may be programmed to interact, in appropriate ways, with any number of application services of interest. This may be advantageous because operators for individual HPLMNs commonly wish to investigate the source networks through which not just one, but perhaps a dozen or more application services are terminating A2P SMS messages to their subscribers. By extension, it is also preferable for the stimulus generator to be configured for use in applying the methods of the present invention in relation to a plurality of independent home networks, as will be discussed further below.

Interface 312, though not essential, is provided in this particular example to facilitate any desired revision to the pre-determined programming.

Turning now to the collection point, this is shown in FIG. 3 as a GSM-enabled smartphone handset 320 that is wirelessly connected to Internet 34. Though not shown explicitly in the drawing, handset 320 is attached to a home network, the operator for which intends to carry out an investigation according to the present invention into A2P SMS traffic sourcing. More specifically, the mobile terminal in this embodiment includes a SIM card that is allocated an MSISDN from among those served by the HPLMN of interest.

Thus, referring again to the discussion made above of the stimulation step 210 of FIG. 2, stimulus generator 310 is programmed to interact with the application server 32, requesting it to send an SMS message to the MSISDN allocated to handset 320. Application server 32 will then route the message to the handset via APLMN SMSC 36.

In the present and other preferred examples, the processing and determination steps 230 to 250 of FIG. 2 are automated by the collection point and the report service shown in FIG. 3 as computer 330, as will now be described.

The collection point 320 illustrated in FIG. 3 is arranged to insert any SMS content received (which, by design, is known to originate from application service 32) into data store 325, enabling the data to be retrieved at a later date if required. Specifically, in this example the smartphone shown is configured, via an application installed thereon, to forward the SMS message payload, together with the GT for SMSC 36, over the Internet into data store 325. In other embodiments, collection point 320 may alternatively be realised as a GSM modem that is connected directly to data store 325 over a wired serial link.

Report service 330 is shown in FIG. 3 as a general purpose computer, which is configured to retrieve the data defining the test SMS messages received at the collection point from database 325. This may be done via the Internet 34 as shown in FIG. 3; alternatively, the database may be physically associated with the report service computer 330. As shown, computer 330 also receives as an input a list 332 of sources of A2P SMS messages that are authorised by the HPLMN. In this example, the list includes a GT for each such allowed source, though in other examples it may take any other suitable form as described above. The report service computer 330 is configured to compare the GT retrieved from data store 325 with those in the allowed list. If the GT identifying the source of the test message is found not to be present in list 332, the report service generates an e-mail informing the HPLMN operator that a new, unauthorised route has been identified as delivering A2P SMS messages to their network, and sends this e-mail to the operator, again over Internet 34. Of course, any of the alternative report protocols described above, or any other suitable or desired approach, could also be adopted. In particularly preferred embodiments of the invention, the report may be generated in or converted to portable document format (PDF), and is uploaded to the Internet for retrieval by the operator of the network. For instance, the report may be made available to the operator through a secure web portal to which the operator is given access.

As mentioned above with reference to FIG. 2, in some cases data store 325 and report service 330 may be omitted, any received SMS messages being processed by the collection point itself and/or a user able to interact with the collection point to determine whether the source network (or networks) used to route them is (are) allowable or not.

Thus, according to preferred embodiments, the system of the invention may be employed to investigate the source networks used by any application service to deliver A2P SMS messages to any one home network, and to report to the operator of the home network in each case. In especially preferred embodiments, the stimulus generator 310 includes functionality enabling a number of such investigations to be scheduled, thus further automating the process as applied to a plurality of home networks in succession. This scheduling will now be described with reference to FIG. 4.

Figure 4:
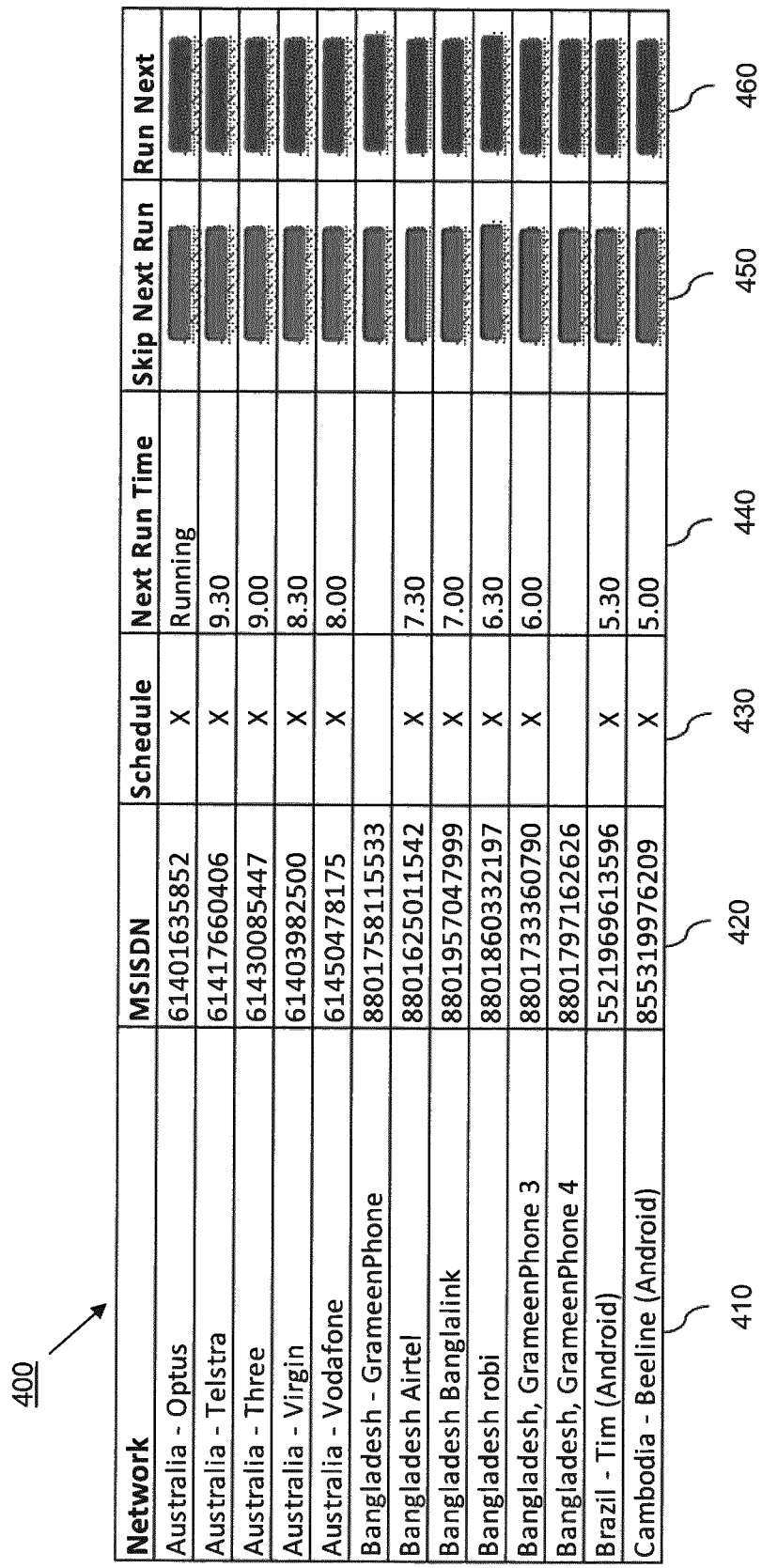
FIG. 4 is a representation of an interface for the stimulus generator of the system of FIG. 3.

FIG. 4 is an exemplary representation of a user interface 400 through which the stimulus generator of the invention may be configured to initiate, in an automated fashion, a plurality of the SMS trafficking investigations presented herein. As shown, interface 400 lists each home network for which an investigation is to be carried out in column 410, and the MSISDN of the corresponding collection point in column 420. Column 430 includes, for each operator, a check-box enabling an investigation to be scheduled. The time at which the next investigation for each operator is due to begin is shown in column 440, whilst columns 450 and 460 include buttons that allow a manual over-ride of the existing schedule by, respectively, removing or bringing forward the next instance of the process of the invention for one or more of the listed operators.

The scheduled investigation for each operator may be executed in relation to all application services that that operator has identified as being of interest. In some examples, the sequence shown in FIG. 4 may be repeated on a periodic basis (for example, once every twenty-four hours) to ensure that any new unauthorised source networks used by application services to deliver SMS content to each home network are identified promptly.

Thus, methods and systems are provided that provides a simple and effective way for a home network operator to identify APLMNs, and their individual network elements, used to terminate A2P SMS traffic to subscribers to his subscribers, allowing the operator to take corrective action against those sources that are doing so without his prior approval or agreement.

The invention claimed is:

1. A method for identifying one or more unauthorised routes used for termination of application-to-person (A2P) short message service (SMS) messages to a mobile telecommunications network, the method comprising:
   providing a collection point arranged to receive A2P SMS messages terminated to the mobile telecommunications network, the A2P SMS messages terminating at the collection point, the collection point comprising a mobile terminal attached to the mobile telecommunications network;
   stimulating an application service to send an A2P SMS message that is addressed to the collection point as an intended recipient;
   receiving the A2P SMS message at the collection point as a terminated A2P SMS message;
   processing the terminated A2P SMS message to obtain an identifier identifying a source of the terminated A2P SMS message; and
   based at least on processing the terminated A2P SMS message, determining whether the identifier corresponds to an authorized source of A2P SMS traffic to the mobile telecommunications network.

2. The method of claim 1 further comprising, if the identifier does not identify an authorised source of A2P SMS traffic to the mobile telecommunications network, determining that the identifier identifies an unauthorised source of A2P SMS traffic to the mobile telecommunications network.

3. The method of claim 1, wherein stimulating the application service to send the A2P SMS message comprises steps of:
   authenticating to the application service;
   entering a functional element within the application service that requires delivery of the A2P SMS message to an end user;

identifying the collection point to the application service; and executing the application service function.

4. The method of claim 1, wherein processing the terminated A2P SMS message to obtain the identifier identifying the source of the terminated A2P SMS message comprises determining a unique network address associated with a network element used to route the A2P SMS message to the mobile telecommunications network.

5. The method of claim 4, wherein determining the unique network address comprises extracting a global title for a source network element from the terminated A2P SMS message.

6. The method of claim 1, further comprising identifying a source network used to route the A2P SMS message to the mobile telecommunications network.

7. The method of claim 1, further comprising providing a list of authorised sources of A2P SMS messages.

8. The method of claim 7, wherein determining whether the identifier corresponds to an authorised source of A2P SMS messages comprises determining whether the identifier corresponds to any of the sources included in the list.

9. The method of claim 1, further comprising notifying an operator for the mobile telecommunications network of whether the source of the terminated A2P SMS message is an authorised source of A2P SMS traffic to the mobile telecommunications network.

10. The method of claim 1 further comprising, if the identifier does not correspond to an authorised source of A2P SMS traffic, notifying an operator for the mobile telecommunications network that an unauthorised source has terminated an A2P SMS message to the mobile telecommunications network.

11. The method of claim 1 further comprising a step of, if the identifier does not correspond to an authorised source of A2P SMS traffic to the mobile telecommunications network, preventing A2P SMS messages from the identified source from terminating to the mobile telecommunications network.

12. A system for use in a method of identifying one or more unauthorised sources of application-to-person (A2P) short message service (SMS) messages terminating to a mobile telecommunications network, the system comprising:

a collection point arranged to receive A2P SMS messages terminated to the mobile telecommunications network, the A2P SMS messages terminating at the collection point, the collection point comprising a mobile terminal attached to the mobile telecommunications network;

a stimulus generator configured to stimulate an application service to send an A2P SMS message that is addressed to the collection point as an intended recipient, the collection point being arranged to receive the A2P SMS message as a terminated A2P SMS message; and means for (a) processing the terminated A2P SMS message to obtain an identifier identifying a source of the A2P SMS message, and (b) based at least on processing the terminated A2P SMS message, determining whether the identifier corresponds to an authorised source of A2P SMS traffic to the mobile telecommunications network.

13. The system of claim 12, further comprising computing means arranged to determine whether the identifier corresponds to an authorised source of A2P SMS traffic to the mobile telecommunications network and, if the identifier does not correspond to an authorised source of A2P SMS traffic, to designate the source as an unauthorised source of A2P SMS traffic to the mobile telecommunications network.

14. The system of claim 12, wherein the stimulus generator is configured to:

authenticate to the application service;

enter a functional element within the application service that requires delivery of the A2P SMS message to an end user;

identify the collection point to the application service; and execute the application service function.

15. The system of claim 12, wherein the means for processing the terminated A2P SMS message to obtain the identifier identifying, the source of the terminated A2P SMS message is configured to determine a unique address associated with the source.

16. The system of claim 12, wherein the collection point comprises GSM-enabled hardware attached to the mobile telecommunications network.

17. The system of claim 13, wherein the computing means is configured to notify an operator tor the mobile telecommunications network of whether the source of the terminated A2P SMS message is an authorised source of A2P SMS traffic to the mobile telecommunications network.

18. The system of claim 13 wherein the computing means is configured to, if the identifier does not correspond to an authorised source of A2P SMS traffic, notify an operator for the mobile telecommunications network that an unauthorised source has terminated an A2P SMS message to the mobile telecommunications network.

19. The system of claim 12, wherein the stimulus generator is configured to stimulate a plurality of application services to send respective A2P SMS messages to the collection point.

20. The system of claim 12, comprising a plurality of collection points each arranged to receive A2P SMS messages terminated to a respective mobile telecommunications network, wherein the stimulus generator is configured to stimulate one or more application services to send A2P SMS messages to each collection point.

* * * * *

UNITED STATES PATENT AND TRADEMARK OFFICE
CERTIFICATE OF CORRECTION

| | |
|---|---|
| PATENT NO. | : 11,349,792 B2 |
| APPLICATION NO. | : 15/546799 |
| DATED | : May 31, 2022 |
| INVENTOR(S) | : Peter Neal et al. |

It is certified that error appears in the above-identified patent and that said Letters Patent is hereby corrected as shown below:

On the Title Page

Item (57) ABSTRACT
Delete "A method for identifying one or more unauthorised routes used for the termination of application-to-person (A2P) short message service (SMS) messages to a mobile telecommunications network, and a system for use in performing the method. An application service is stimulated to generate an A2P SMS message, and to send it to a collection point. The message is processed to obtain an identifier identifying a source of the message, and it is determined whether the identifier corresponds to an authorised source of A2P traffic to the network." and insert -- A method for identifying one or more unauthorised routes used for the termination of application-to-person (A2P) short message service (SMS) messages to a mobile telecommunications network, and a system for use in performing the method. An application service is stimulated to generate an A2P SMS message, and to send it to a collection point. The message is processed to obtain an identifier identifying a source of the message, and it is determined whether the identifier corresponds to an authorised source of A2P SMS traffic to the network. --.

In the Claims

Column 14, Line 34, Claim number 17, delete "tor" and insert -- for --.

Signed and Sealed this
Twelfth Day of July, 2022

Katherine Kelly Vidal
*Director of the United States Patent and Trademark Office*